United States Patent
Grube et al.

[11] Patent Number: 5,493,286
[45] Date of Patent: Feb. 20, 1996

[54] METHOD FOR PROVIDING COMMUNICATIONS WITHIN A GEOGRAPHIC REGION

[75] Inventors: Gary W. Grube, Palatine; Marc C. Naddell, Schaumburg; Mark L. Shaughnessy, Algonquin, all of Ill.

[73] Assignee: Motorola, Inc., Schaumburg, Ill.

[21] Appl. No.: 466,313

[22] Filed: Jun. 6, 1995

Related U.S. Application Data

[63] Continuation of Ser. No. 209,326, Mar. 10, 1994, abandoned.

[51] Int. Cl.$^6$ .............................. G08B 5/22; H04Q 7/06; H04Q 3/02
[52] U.S. Cl. ................................. 340/825.44; 455/33.4; 455/38.1; 340/825.47
[58] Field of Search ...................... 340/825.44, 825.47; 455/15, 17, 33.1, 33.4, 34.1, 38.1

[56] References Cited

U.S. PATENT DOCUMENTS

| | | | |
|---|---|---|---|
| 4,935,732 | 6/1990 | Andros et al. | 340/825.44 |
| 5,089,813 | 2/1992 | DeLuca. | |
| 5,129,095 | 7/1992 | Davis et al. | 340/825.44 |
| 5,230,081 | 7/1993 | Yamada et al. | 455/33.1 |
| 5,287,541 | 2/1994 | Davis et al. | 455/33.1 |

OTHER PUBLICATIONS

ETSI, ETS 300 131 (prl), Jun. 1993, Second Edition, pp. 1–265.

*Primary Examiner*—Alyssa H. Bowler
*Assistant Examiner*—Mark H. Rinehart
*Attorney, Agent, or Firm*—Wayne J. Egan

[57] ABSTRACT

Communications may be established based on geographic location when a communication resource controller (101) transmits a communication message (119), which includes a message ID (120) and a communication payload (121), to a plurality of communication units (102, 103). Each of communication units (102, 103) upon receiving the communication message (119), compares its identification code (122) with the message ID (120). If a match occurs, the communication unit (102, 103) then determines its geographic location. Having obtained the geographic location, the unit then does a table look-up to determine, based on the message ID code, a geographic communication area (126). Having obtained this information, the unit then determines whether its present location is within the geographic communication area and if so, adjust its receiver to receive the communication payload (121).

16 Claims, 2 Drawing Sheets

5,493,286

METHOD FOR PROVIDING COMMUNICATIONS WITHIN A GEOGRAPHIC REGION

This is a continuation of prior application Ser. No. 08/209,326, filed Mar. 10, 1994, and now abandoned, by Gary W. Grube et al., the same inventors as in the present application, which prior application is assigned to Motorola, Inc., the same assignee as in the present application, and which prior application is hereby incorporated by reference verbatim, with the same effect as though the prior application were fully and completely set forth herein.

FIELD OF THE INVENTION

This invention relates generally to communication systems and, in particular, to geographic location based communications.

BACKGROUND OF THE INVENTION

Communication systems are known to include a communication resource controller, a plurality of communication units, and antennas that transceive a limited number of communication resources. In such communication systems, the communication units communicate with each other via the communication resources, where a communication resource may be an RF channel, a pair of RF channels, a TDM slot, or any medium for carrying RF signals.

To initiate a communication, a communication unit transmits a communication request to the communication resource controller via a communication resource dedicated for control information (control channel). The communication request includes a request for a particular service, such as allocation of a communication resource, and identity of a target communication unit(s). For example, the request may be for a group call which identifies all of the communication units in the same group as the initiating communication unit.

Upon receiving this communication request, the communication resource determines whether the communication unit is authorized to access the system and, if so, grants the request. Having granted the request, the communication resource controller allocates a communication resource to the initiating communication unit and the target communication units and then transmits a communication resource allocation message on the control channel. All communication units within the coverage area of the control channel antenna receives the allocation message. However, only the communication units identified in the message, i.e., the initiating and target communication units, will access the allocated communication resource and subsequently partake in the communication.

This method of communication resource allocation works very well in many trunking communication system applications, however, because the coverage area of an antenna can be quite large (typically having a 10 to 30 mile radius), this method has it's limitations. For example, assume that the antenna is centrally located in metropolitan area and the antenna is used by the metropolitan's police force. Further assume that the police force is divided into districts, where each district has its own communication group. With this basic structure, when a police officer initiates a group call for his or her district, all other police officers from that district will receive the group call provided they are within the coverage area of the antenna. If one or more of the receiving police officers are outside of the district, it is impractical for them to receive the call because they are physically unable to respond due to their geographic location, or they may be out of the initiator's jurisdiction. (With the 30 mile coverage radius, a police officer may be up to 60 miles away from the district, making it impossible for him or her to physically respond.) In addition to being unable to physically respond, the police officer's radio is tied up with a communication that he or she can do little about, thus preventing that radio from receiving another call. A call which the officer may be able to respond to based on his or her physical location.

Therefore, a need exists for a method that allows communications to be established based on geographic locations.

DESCRIPTION OF A PREFERRED EMBODIMENT

Generally, the present invention provides a method that establishes communications based on geographic locations. This is accomplished when an initiating communication unit transmits a request for a communication to a communication resource controller. Upon receiving this request, the communication resource controller grants the request and transmits a communication message to a plurality of communication units, wherein the message includes an identification code and a communication payload. Upon receiving the communication message, each communication unit determines whether the identification code contained within the message matches an individual identification code of the communication unit. If the codes match, the communication unit then determines its geographic location and compares its location with a geographic communication area. If the communication unit is within the geographic communication area, it adjusts its receiver to receive the communication payload. With such a method, communication units only participate in communications if they are within a predefined geographic area, thus eliminating communication units that are physically too far away from the geographic area.

Figure 1:
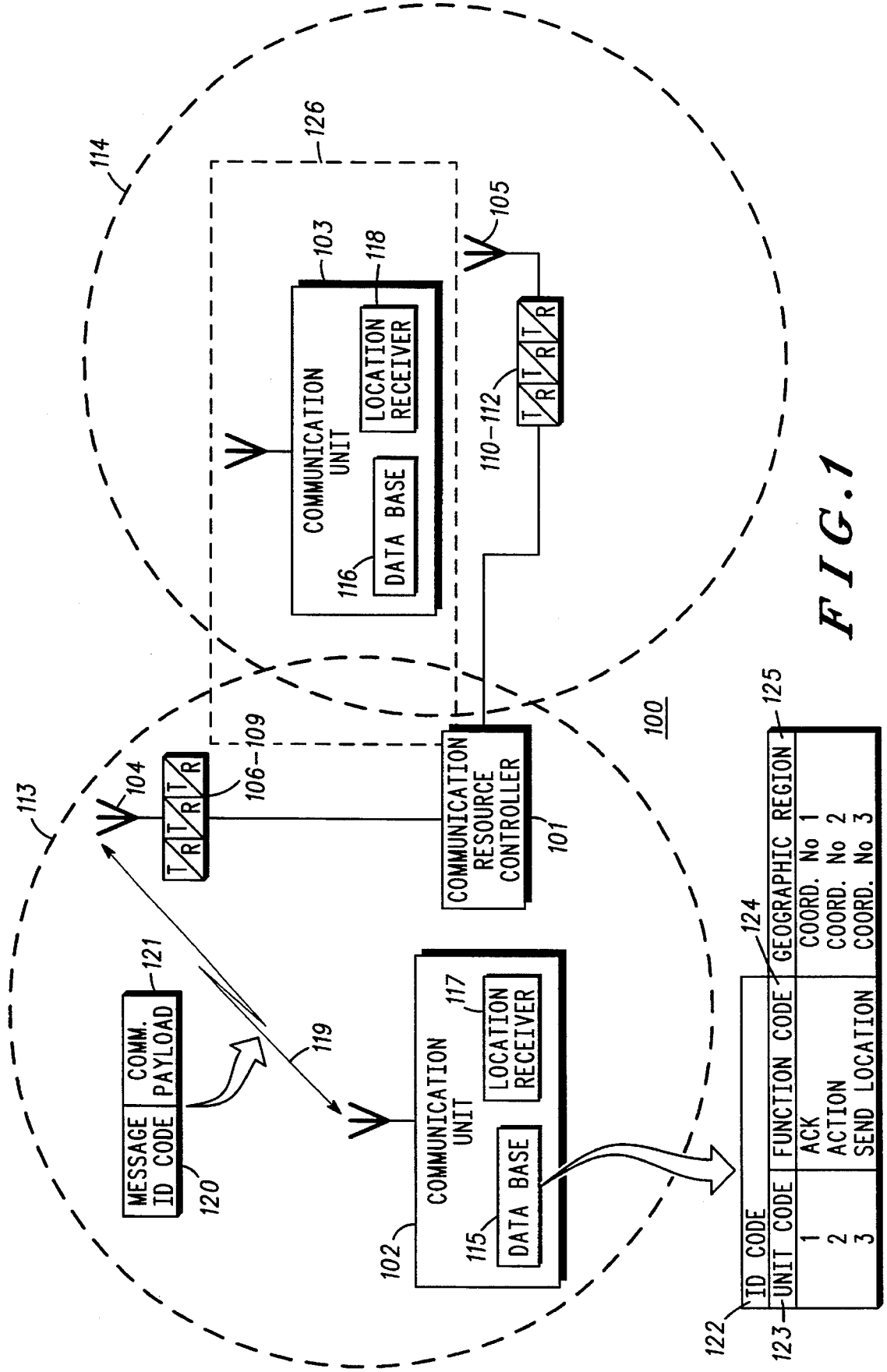
FIG. 1 illustrates a communication system that incorporates the present invention.

The present invention can be more fully described with reference to FIGS. 1 and 2. FIG. 1 illustrates a communication system (100) that includes a communication resource controller (101), a plurality of communication units (102 and 103), a plurality of antennas (104 and 105) and a limited number of communication resources (106–112). Each of the antennas (104 and 105), which may be incorporated in a base station such as Motorola QUANTAR™, has an RF coverage area (113 and 114). Each of the communication units (102 and 103), includes a data base (115 and 116), and a location receiver (117 and 118). The data base (115 and 116), which may be RAM, ROM, or any other digital storage element, includes a unit code field (122), a function code field (124) and a geographic region field (125), wherein the unit code and the function code comprise a communication unit identification code (122). The location receiver (117, 118) may be a Global Positioning Satellite (GPS) receiver that is coupled to a communication processor (not shown).

Within the communication system (100), any of the communication units (102, 103) may initiate a communication by transmitting a request to the communication resource controller (101). The communication resource controller (101), which may be a Motorola trunking central controller, processes the request and prepares a communication message (119) based on the request. For example, if the request was for a group call, the communication message (119) would include a target message ID code (120) which identifies a particular group for which the group call was requested and a communication payload (121). The communication payload (121) may be voice messages, data messages, graphical images, files, or a request for information. As a further example, the request may be for a one-to-one communication, in this case, the communication message (119) would include the identification code of the targeted communication unit as the message ID code (120) and the communication payload. In addition, the message ID code (120) may include a function code that instructs the receiving communication unit to respond. For example, the function code may request an acknowledgment signal, an action to be performed, or send location.

Regardless of the content of the communication message (119), the message is transmitted via the antenna (104, 105). If a communication unit (102, 103) is within the antenna RF coverage area (113, 114)), it will receive the communication message (119). Upon receiving the communication message (119), the unit determines whether the target code and function code of the message code (120) matches the communication units group code or individual code (123) and the function code (124). If a match occurs, the communication unit accesses its data base (115) to determine the geographic communication area (126), which are stored as geographic coordinates in the geographic region field (125). In addition, the communication unit determines its geographic location via the location receiver (117) and then determines if it is located within the geographic communication area (126). If the communication unit is within the geographic communication area (126), the unit then adjusts it receiver to receive the communication payload.

The geographic communication area (126) is pre-established based on desired coverage area of a particular communication and is independent of the coverage areas (113, 114) of the antennas (104, 105). Thus, the geographic communication area (126) may be as large or as small as needed by the users, and may extend across the coverage areas of several antennas. To illustrate this concept consider the following example.

As a working example, assume that the communication units shown are operated by police officers in the same district (communication group) and a group call has been initiated for that group. In response to the request, the communication resource controller (101) prepares the communication message (119) to include a communication group ID code of "1", a function code of "ACK", and a payload (121). The message (119) is then transmitted via the antennas (104, 105). Both communication units (102, 103) are within the coverage areas of the antennas (113, 114), thus they receive the message (119).

Upon receipt, the units (102, 103) determine whether their ID codes (122) match the message ID (120). In this example, both units (102, 103) have a match. The next step is for each unit to determine its geographic location and compare the geographic location with the geographic communication area (126) identified in the geographic region field (125). In this example, the geographic communication area may define the boundaries of the district, and, as is shown, the communication unit having a reference number of 103 is within the district, while the other unit is not. Thus, only the unit within the district will receive the communication payload, which may be a request for backup. This example illustrates a benefit of the present invention, in that, only units within a particular geographic region will receive the call. Where, units not within the region, and thus too far away to physically respond, will not receive the call and will be able to receive other calls that they may be physically able to respond, or provide assistance.

Figure 2:
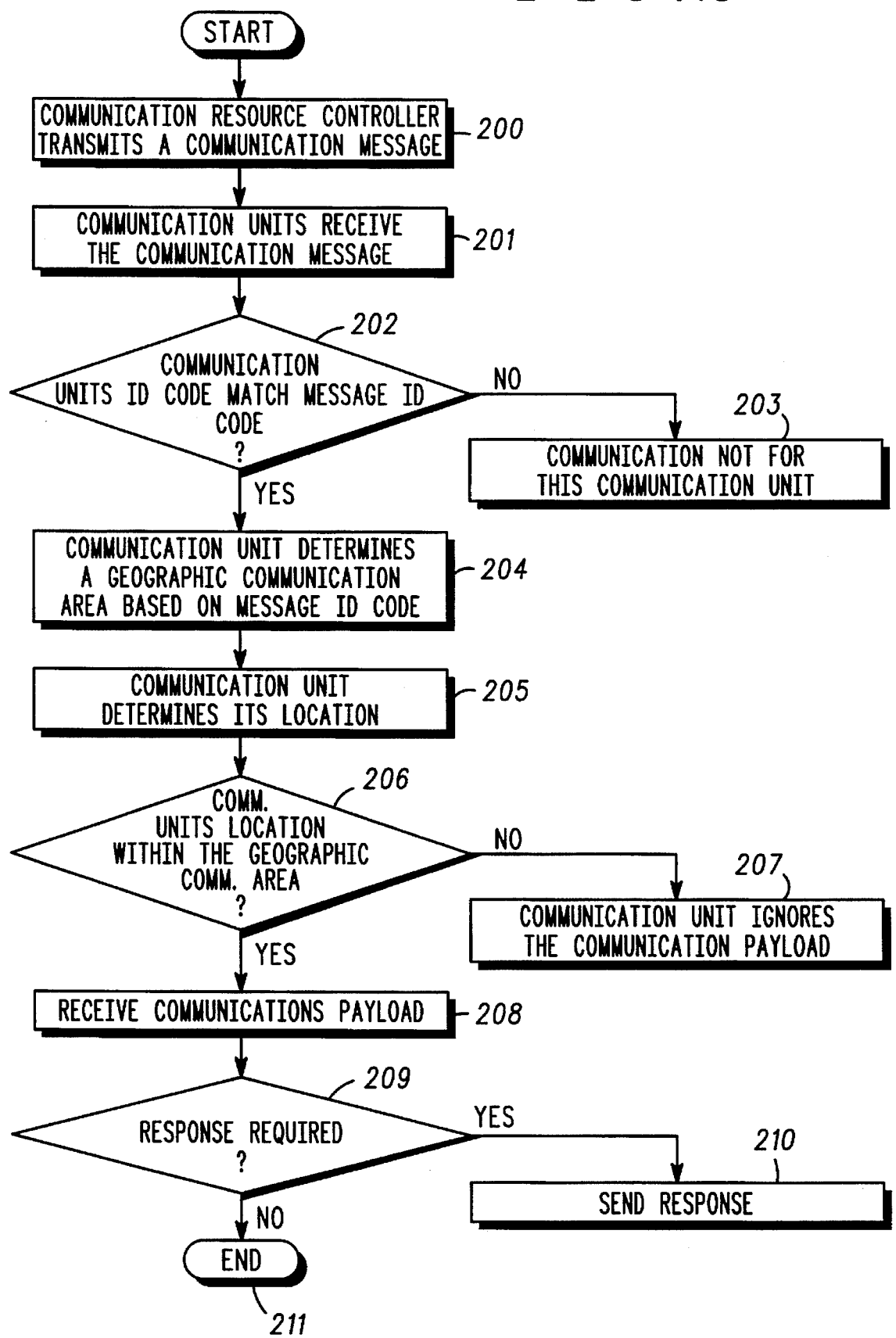
FIG. 2 illustrates a logic diagram that may be used to implement the present invention.

FIG. 2 illustrates a logic diagram that may be used to implement the present invention. At step 200, the communication resource controller transmits a communication message via a control channel. As mentioned above, the communication message includes a message ID code and a communication payload. A communication unit that is located within the antenna RF coverage area (113, 114) receives the communication message (201) and determines whether its identification code matches the message identification code (202). If a match does not occur (202) the communication unit determines that this particular message is not for the unit (203).

If, however, a match does occur (202), the communication unit determines a geographic communication area based on the message code (204), i.e. ascertaining coordinates of the particular geographic communication area from the geographic region field of the data base. Having obtained this information, the communication unit determines its present geographic location (205). The communication unit then determines whether it is within the geographic communication area (206). If the communication unit is not within the geographic communication area (206), the communication unit ignores the communication payload (207).

When the communication unit is located within the geographic communication area (206), the communication unit receives the communication payload (208). Upon receiving the communication payload, the communication unit determines whether a response is required (209), wherein the response request would be included as part of the function code (see above). If so, the communication unit responds to that request (210). If no response is required (209) the process ends (211).

The present invention provides a method that allows communications to be established based on geographic areas. With such a method, communication units located within a geographic communication area can participate in the communication, while units not within the area, even though they are part of the communication group, will not participate. This focuses group calls to units that are physically close together and thus more likely to be able to help each other than a unit that it is too far away. In addition, units that are not within the communication area are free to receive other calls in which they may be able to provide assistance.

We claim:

1. In a communication system that includes a communication resource controller, a limited number of communication resources that are transceived via an antenna, and a plurality of communication units, a method for a providing communications within a geographic region, the method comprises the steps of:

a) transmitting, by the communication resource controller, a communication message, wherein the communication message includes a message identification code and communication payload;

b) determining, by a communication unit of the plurality of communication units, whether the message identification code substantially matches an identification code of the communication unit;

c) when the message identification code substantially matches the identification code, accessing, by the communication unit, a database to determine a geographic communication area based on the message identification code, wherein the geographic communication area is defined by a set of geographic coordinates independent of radio frequency coverage area of the antenna;

d) when the message identification code substantially matches the identification code, determining, by the communication unit, geographic location of the communication unit, wherein the geographic location is not based on the communication message:

e) when the message identification code substantially matches the identification code, determining, by the communication unit, whether the geographic location of the communication unit is within the geographic communication area; and f) when the message identification code substantially matches the identification code, and when the geographic location of the communication unit is within the geographic communication area, receiving, by the communication unit, the communication payload.

2. The method of claim 1 further comprises, ignoring, by the communication unit, the communication payload when the location of the communication unit is not within the geographic communication area.

3. In the method of claim 1, step (f) further comprises receiving data as the communication payload.

4. In the method of claim 1, step (f) further comprises receiving a speech message as the communication payload.

5. In the method of claim 1, step (f) further comprises receiving a graphical image as the communication payload.

6. In the method of claim 1, step (b) further comprises determining whether a target code of the message identification code substantially matches a unit code of the identification code and whether a function code of the message identification code substantially matches one of a set of function codes of the identification code.

7. The method of claim 1 further comprises transmitting, by the communication unit, a response to the communication payload.

8. The method of claim 7 further comprises transmitting, by the communication unit, the geographic location of the communication unit as the response.

9. A method for a communication unit to participate in communications based on geographic location, the method comprises the steps of:

a) receiving a communication message, wherein the communication message includes a message identification code and communication payload;

b) determining whether the message identification code substantially matches an identification code of the communication unit;

c) when the message identification code substantially matches the identification code, accessing a database to determine a geographic communication area based on the message identification code, wherein the geographic communication area is defined by a set of geographic coordinates independent of radio frequency coverage area of an antenna that transmitted the communication message;

d) when the message identification code substantially matches the identification code, determining geographic location of the communication unit, wherein the geographic location is not based on the communication message;

e) when the message identification code substantially matches the identification code, determining whether the geographic location of the communication unit is within the geographic communication area; and (f) when the message identification code substantially matches the identification code, and when the geographic location of the communication unit is within the geographic communication area, receiving the communication payload.

10. The method of claim 9 further comprises, ignoring the communication payload when the location of the communication unit is not within the geographic communication area.

11. In the method of claim 9, step (f) further comprises receiving data as the communication payload.

12. In the method of claim 9, step (f) further comprises receiving a speech message as the communication payload.

13. In the method of claim 9, step (f) further comprises receiving a graphical image as the communication payload.

14. In the method of claim 9, step (b) further comprises determining whether a target code of the message identification code substantially matches a unit code of the identification code and whether a function code of the message identification code substantially matches one of a set of function codes of the identification code.

15. The method of claim 9 further comprises transmitting a response to the communication payload.

16. The method of claim 15 further comprises transmitting the geographic location of the communication unit as the response.

\* \* \* \* \*